Jan. 31, 1967 J. P. RENSHAW 3,301,244
PISTON STROKE CONTROL MECHANISM
Filed Nov. 9, 1964      2 Sheets-Sheet 1

JOHN P. RENSHAW
INVENTOR.

BY
*Townsend and Townsend*

JOHN P. RENSHAW
*INVENTOR.*

BY
*Townsend & Townsend*

United States Patent Office 3,301,244
Patented Jan. 31, 1967

3,301,244
PISTON STROKE CONTROL MECHANISM
John P. Renshaw, 340 Pine St.,
San Francisco, Calif. 94104
Filed Nov. 9, 1964, Ser. No. 411,182
3 Claims. (Cl. 123—197)

This invention relates to a mechanism for affording transmission of power between a rotatable shaft and a reciprocating piston so that the rate of piston movement varies in relation to the position of the shaft, and is a continuation-in-part of applicant's co-pending application, Serial No. 393,883, filed September 2, 1964, for Piston Stroke Control Mechanism.

Much of the energy produced by burning fuel in an internal combustion engine is lost by heat absorption through the cylinder walls and into the cooling air or water. The amount of energy lost as a result of such heat is a function of the time necessary for the piston to move during the expansion stroke within the cylinder. After fuel burning, the faster the piston moves within the cylinder during expansion, the correspondingly less energy will be lost or dissipated as heat; consequently the faster the piston moves in the cylinder, the more efficient and greater will be the conversion of the energy to production of torque. The present invention provides a mechanism for exploiting the foregoing phenomenon without requiring unduly high rotative shaft speeds or complex linkages between the piston and the main power shaft.

The invention as more specifically described hereinafter includes a gear train, one gear of which is connected to the main power shaft and another of which is associated with a crankshaft which converts reciprocable movement of the piston to rotary movement. The two gears are variable in their gear ratio during the cycle of operations, yet cause a constant rate of rotation of the power shaft to result in or be caused by faster and slower rates of movement of the piston. The variable gear ratio and the timing of the internal combustion engine are arranged so that the expansion movement of the piston from top dead center to bottom dead center can occur in less than 50% of the main shaft rotation, while movement of the piston from bottom dead center to top dead center can occur in more than 50% of the main shaft rotation. Thus, because of the faster piston movement, more of the energy produced from the combustion is converted to torque and less energy is converted to heat.

Likewise, for some purposes such as a high r.p.m. engine, the reverse may be desirable. Piston expansion may be made to occur in more than 50% of the main shaft rotation, and compression in less than 50% of the main shaft rotation.

In conventional internal combustion engines and like reciprocating machines a piston is connected by a piston rod to a crankshaft, so that the piston velocity sinusoidal curve depends upon the stroke length and piston rod length, and the instantaneous position of the piston depends upon the crankshaft and piston rod angle. In such conventional systems the piston maintains the same velocities while at comparable positions regardless of the direction of the stroke; and furthermore, the slopes of the curve obtainable are limited by the various fixed combinations of stroke length and piston rod length available. In the subject application the aforesaid characteristic of such conventional type engines is referred to as a "linear rate of piston movement." In the present invention a non-linear rate of piston movement is obtained because of a variable gear ratio which is either additive or subtractive of the piston velocity caused by the conventional piston rod to crankshaft angular positions.

The desirability of providing a non-linear rate of piston movement within an internal combustion engine has been well recognized in the art. There have been numerous attempts to obtain this result. However, the apparatus that has been advanced by the art employs structure in which the non-linear rate of movement is occasioned by complicated linkages employing frictionally rubbing parts or the like which are mated under rather severe pressures during engine operation. This type of structure is difficult to lubricate and maintain without rapid deterioration and wear. Others of the attempts to accomplish this type of piston movement have involved a great number of operating parts for relatively large and cumbersome structures which in some cases made it impossible to create a truly practical engine embodiment.

The present invention employs a novel combination of gear train relationships to effectuate the non-linear translation of piston movement to constant power shaft rotation, and as a feature and advantage of the aforesaid gear train relationship the entire structure can be compacted into areas comparable to the areas required for conventional engines.

As a further object of the invention all the torque conversion from the movement of the piston rod to the main power shaft is caused by continuously enmeshed gears which are easily lubricated and which are not subjected to the extremely high surface pressures arising in relative movement of frictionally engaged bodies that have been employed in prior art structures to obtain non-linear piston movement.

In the present invention there is employed a novel combination of gears which either by their eccentric mounting on their shafts, eccentric shape, or variable angle of attack of the respective gear teeth formulate different gear ratios through different rotational phases of operation, thereby imparting a different or non-linear ratio of movement between the piston and the power shaft.

Due to the simplicity of the structure afforded by this invention, it is possible to time the differential rate of piston movement in accordance with the most efficient rate change required for a particular engine operation. Thus, only a proper selection of the gear shapes and placement on the shaft is necessary to provide the requisite timing.

Another feature and advantage of this invention lies in the fact that the rate of change of piston motion that is practically usable or obtainable with the novel gear system combination is well suited to afford different ratios of piston movement between and within the combustion and other strokes of the engine's operation for enhanced efficiency.

Another feature and advantage of the present invention lies in the fact that the various parts of the gear train can be as readily replaced, should wear occur, as parts of an ordinary transmission or other gear operated torque converters, and thus it does not require the special fitting of frictionally wearing parts which must be specially fitted or worn-in in order to effect adequate replacement.

A further feature and advantage of this invention is that a plurality of piston-cylinder combinations can be provided around a central power shaft having one gear thereon, all of which pistons are operated from individual gears enmeshed with a single gear on the power shaft.

The present invention, because of its relative simplicity in providing the more effective stroke ratio relationships, is particularly suitable for multiple cylinder placements, such as radial, in-line, and V-eight combinations, as well as hybrid combinations of such engines.

A further object of the invention is that the torque converting gear train is capable of operation at high speeds, and thus such an engine would be capable of operating within the ranges of speeds that are currently possible with many of the conventional engines. However, the increased efficiency of the engine at its lower speeds render the engine substantially more suitable in the lower speed ranges than the conventional type engines.

A still further object is to make more practical and desirable the use of either an exhaust turbine mechanically geared to the power shaft for extra power or an exhaust turbine compressor unit for supercharging engine inlet air. Because the present invention provides less heat loss to the cooling system, higher exhaust temperatures and pressures are available for driving such turbine. Also because engine detonation in a carburative spark ignition engine or peak sustainable pressure in a diesel engine can limit the degree of desirable inlet air supercharging, faster than normal piston expansion makes possible higher sustainable supercharging and secures the beneficial results consequent thereupon.

Yet another object of the present invention is to provide a specific non-linear piston to power shaft linkage which improves high r.p.m. operation. This characteristic is obtained by establishing variable gear ratios which cause piston movement near ends of a stroke to be slower to provide additional time for combustion and valving operations.

An additional feature and advantage of this invention is that the torque delivered to a shaft through the improved linkage is distributed more evenly over each revolution of the shaft without creation of excessive bearing pressures attending frictional or slippage type linkages.

In the present invention the gears connected to the piston rod have inertial characteristics which create an advantage which is unobtainable in prior art solutions to the problem of providing various rates of piston movement relative to crankshaft movement. These gears, because of their inertial characteristics, cause energy to be stored in the gear during the interval when the gear is moving towards its most rapid angular velocity. The same energy is then returned to this system during the interval that the piston gear is moving towards a relatively slower angular velocity. This factor can be controlled conveniently by selection of piston gears of appropriate mass and configuration to provide a controlled absorption and return of energy. As a result of this factor it is possible to smooth out or expand the torque conversion interval over a broader base timewise than was possible in prior art devices.

It can be seen, for example, that if the piston is arranged to move more rapidly on the power stroke the torque conversion to the crankshaft would normally rise to a more rapid peak with a more rapid fall-off. In the present invention the inertial characteristics of the piston gear can absorb energy during part of the power stroke to cause the torque transference to the crankshaft to be on a flatter curve timewise, thus rendering a smoother engine operation.

Other features, objects and advantages of the present invention will become more apparent upon perusal of the following specification in conjunction with the accompanying drawing wherein similar characters of reference represent similar structure in each of the separate views.

Figures 1, 2, 3, 4:
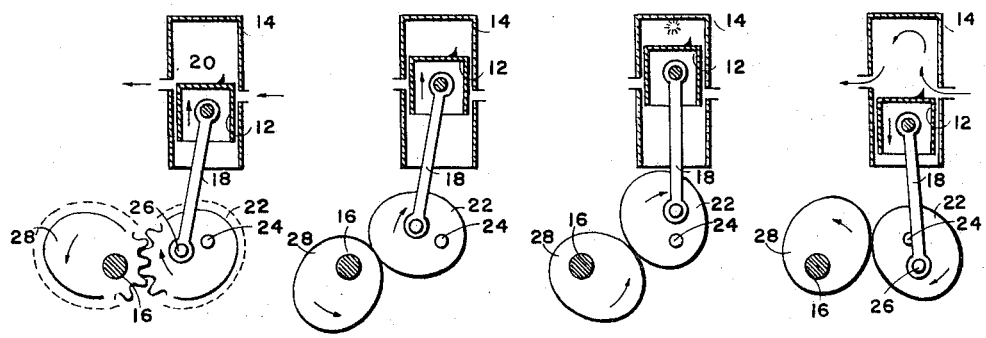
FIG. 1 is a schematic view of a satisfactory embodiment of the present piston stroke control linkage as used in an internal combustion engine with the piston shown near the beginning of the upward compression stroke.
FIG. 2 is a view similar to FIG. 1 showing, however, the piston near the top of the compression stroke.
FIG. 3 is a view similar to FIG. 1 showing, however, the piston at top dead center and at the time of firing.
FIG. 4 is a view similar to FIG. 1 showing, however, the piston near bottom dead center.

The present invention affords a non-linear linkage between a piston 12, reciprocably slidable in a cylinder 14, and a main power shaft 16 which develops torque to drive a load. Because provision of ignition systems and fuel supply systems is well within the competence of one skilled in the art, such accoutrements are not here shown or described.

A connecting rod 18, secured at one end thereof to piston 12 by a wrist pin 20, is provided for transmitting force and motion of the piston exteriorly of cylinder 14. In the embodiment shown in FIGS. 1-4, an elliptical piston gear 22 is mounted for rotation about crankshaft axis 24 which axis extends through one focus of the elliptical gear. Connecting rod 18 is rotatably attached to gear 22, as at 26, eccentrically with respect to axis 24 so that reciprocal motion of piston 12 is converted to rotary motion of gear 22. Enmeshed with the teeth on gear 22 is a second elliptical gear 28 which is secured to power shaft 16 for rotation therewith. Power shaft 16 extends through one focus of gear 28 so that the teeth on gears 22 and 28 are continuously enmeshed for a full rotation of each of the gears.

The operation of the present invention can be understood from a study of FIGS. 1-4. In FIG. 1, piston gear 22 is assumed to be rotating in a clockwise direction (for example, by inertia of a fly wheel, not shown) and piston 12 moves upwardly in cylinder 14 in a compression stroke. Responsive to such rotation of piston gear 22, power gear 28 and shaft 16 rotate in a counter-clockwise sense, since the power gear is meshed with the piston gear. The relative position of the gears is indicated graphically at 30 in FIG. 5. FIG. 2 indicates the cycle of engine operation after power gear 28 has rotated 90° from the position of the gear shown in FIG. 1. Since gears 22 and 28 are elliptical, the ratio between the gears is variable and gear 22 rotates less than 90° between the positions of FIG. 1 and FIG. 2. The position of piston 12 as shown in FIG. 2 is depicted graphically at 32 in FIG. 5.

In FIG. 3, power gear 28 is shown after rotation of still another 90° in a counter-clockwise direction. At such position, piston 12 has reached top dead center (indicated at 34 in FIG. 5) and ignition in cylinder 14 has occurred. Thus the power stroke or power phase of the cycle is initiated, and the expanding gases resulting from combustion in cylinder 14 urge piston 12 downwardly. The downward movement of piston 14 causes piston gear 22 to rotate 180° but causes power gear 28 and shaft 16 to rotate only approximately 105°. Such movement takes place rapidly because of the non-linear relation between piston movement and power shaft rotation. Moreover, since the teeth on gears 22 and 28 are continuously meshed, proper and effective lubrication of the system is possible.

Figure 6:
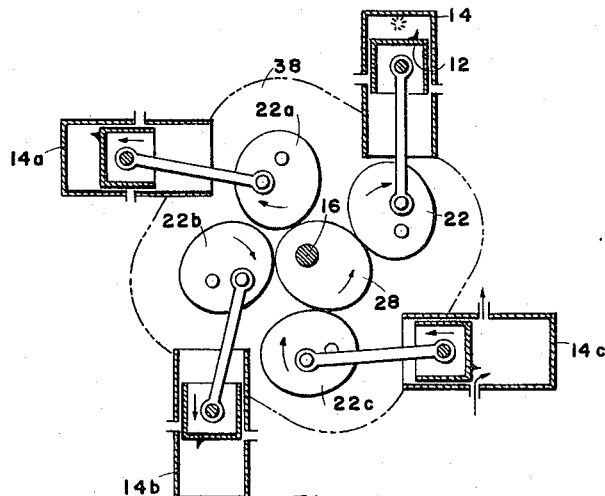
FIG. 6 is a schematic view of a four cylinder, two cycle engine incorporating the improved stroke control linkage.

Referring to FIG. 6, an engine block shown schematically at 38 is provided with suitable journals, (not shown) for supporting shaft 16 on which power gear 28 is mounted. Cylinders 14, 14a, 14b and 14c are formed in an engine block 38. Each cylinder has reciprocably slidably disposed therein a piston 12. Associated with each cylinder, in the manner described hereinabove in respect to FIGS. 1-4, is an elliptical piston gear 22, 22a, 22b and 22c, each of which mounts a connecting rod connected to the associated piston. Piston gears 22, 22a, 22b and 22c are so timed with respect to power gear 28 that three pistons are moving in the upward or compression stroke while one piston is moving in the downward power stroke during any position of power gear 28. For example, in FIG. 6, piston gear 22 is in a position similar to that shown at FIG. 3, piston gear 22a is in a position similar to that shown in FIG. 2, piston gear 22b is in a position similar to that shown in FIG. 1 and piston gear 22c is in a position similar to that shown in FIG. 4. Because piston gears 22 are spaced uniformly about power shaft 16 and are congruent with power gear 28, the piston gears clear one another and are all continuously enmeshed with the power gear.

Figures 7, 8, 9, 10, 11:
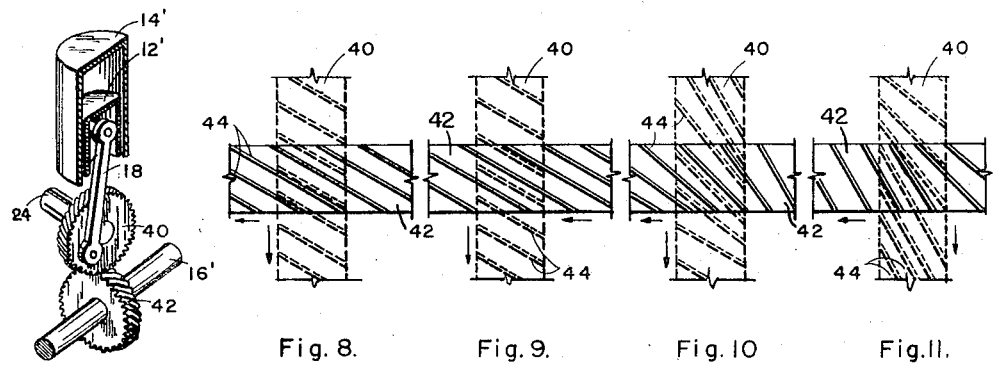
FIG. 7 is a schematic view in perspective of another satisfactory embodiment of this invention.
FIG. 8 is a schematic view of the gear tooth relationship of FIG. 7 when the piston is in a position as shown in FIG. 1.
FIG. 9 is similar to FIG. 8 showing the gear tooth relationship when the piston is in a position as shown in FIG. 2.
FIG. 10 is similar to FIG. 8 showing the gear tooth relationship when the piston is in a position as shown in FIG. 3.
FIG. 11 is similar to FIG. 8 showing the gear tooth relationship when the piston is in a position as shown in FIG. 4.

Referring to FIG. 7, a cylinder 14' is shown schematically and has reciprocable slidable therein a piston 12'. A connecting rod 18' is pivotally secured to piston 12' and is mounted eccentrically with respect to a crankshaft 24' by means of a helical gear 40. Thus rotation of gear 40 about crankshaft 24' effects reciprocation of piston 12' within cylinder 14'. Spaced from crankshaft 24' is a power shaft 16' which is rotatably supported by bearings (not shown) on an axis obliquely oriented relative the axis of crankshaft 24'. Secured to power shaft 16' is a second helical gear 42 having teeth on the periphery thereof for enmeshing with gear 40. Thus as piston 12' reciprocates, power shaft 16' rotates in response thereto.

The relationship between reciprocating movement of piston 12' and rotative movement of power shaft 16' is established in a non-linear fashion. The varying relative gear ratio between the gears is made to conform with the graph of FIG. 5, by providing the teeth 44 on each gear at varying helix angles about the periphery of each gear. FIG. 8 corresponds to the relationship between the teeth on the gears 40 and 42 when the engine is in the phase of operation delineated at 30 in FIG. 5. Power gear 42 is moving rightwardly and piston gear 40 is moving downwardly. In such phase of operation the teeth are so angularly oriented that the periphery of the power gear moves about one and one-half times the periphery of the piston gear, as a consequence of which piston 12' moves upwardly in cylinder 14' at a relatively slow rate of movement. FIG. 9, which corresponds with the phase of operation depicted at 32 in FIG. 5, continues the relatively solw rate of upward piston movement since the teeth in the portion of the gears shown in FIG. 9 are at substantially the same angle as that in FIG. 8. In FIG. 10 the gears are shown as the piston reaches top dead center (reference character 34 of FIG. 5) at which time the angle of teeth 44 changes so that the periphery of piston gear 40 travels at approximately the same rate as the periphery of the power gear 42. As piston 12' moves downwardly in the expansion stroke, the helix angle of teeth 44 change so that piston gear 40 rotates at approximately twice the speed of rotation of power gear 42. The rapid movement of piston 12 resulting therefrom occurs in approximately 105° of rotation of power shaft 16 after which the teeth return gradually to the angle existing in FIGS. 8 and 9.

Figure 5:
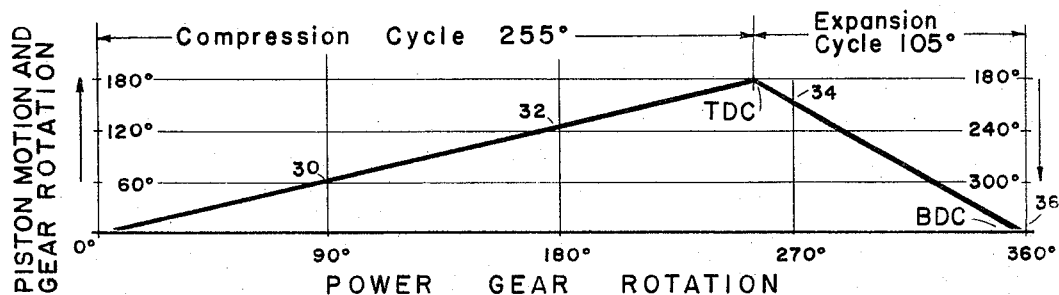
FIG. 5 is a schematic plot of power gear rotation versus piston gear rotation for one revolution of engine operation.

Thus the time relation depicted on the graph of FIG. 5 can be obtained without the necessity of providing eccentrically mounted gears as in the embodiment described above in connection with FIG. 6. Obviously, in producing a multiple cylinder engine incorporating the gear train of FIG. 7, a plurality of crankshafts 24' and piston gears 40 can be placed around shaft 16 enmeshed with power gear 42 to provide a radial engine or alternatively a plurality of power gears 42 can be mounted on shaft 16', each such power gear having one or more piston gears 40 associated therewith. Moreover, gears 40 and 42 can be provided in bevel form should a specific situation require an oblique angle between shafts 16' and 24'. Teeth 44 can be arranged in any suitable angular pattern to secure the necessary varying gear ratio between the gears.

Figure 12:
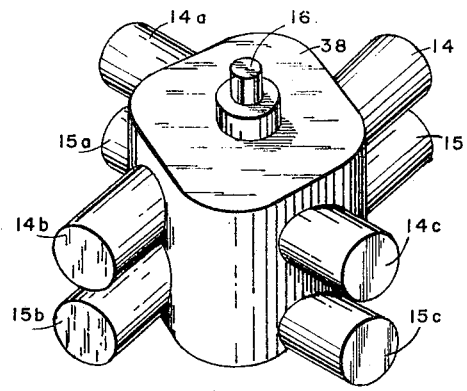
FIG. 12 is a schematic view of an eight cylinder hybrid engine constructed in accordance with the present invention.

FIG. 12 shows in schematic form a cylinder arrangement that is possible with the present invention. The reference characters therein set forth refer to similarly denoted elements in FIG. 6. Engine block 38 is extended, however, to form four additional cylinders, three of which (15, 15b, and 15c) are visible. Obviously, the additional cylinders are provided with pistons, rods, and piston gears, all timed in relation to cylinders 14-14c to produce smooth engine performance.

Figure 13:
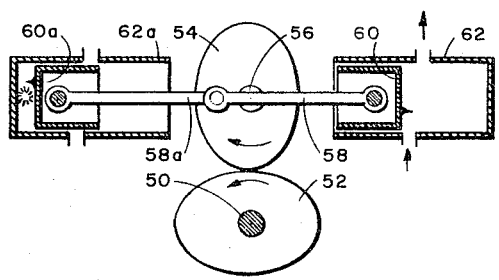
FIG. 13 is a schematic view of still another embodiment of the present invention.

The structure for securing non-linear piston movement that has been described hereinabove is primarily useful in increasing engine efficiency at relatively low r.p.m. The present invention is, however, equally useful in optimizing the power output of high speed engines. In such engines ignition takes place before top dead center so that time is available for sufficient cylinder pressure to build up for urging the piston downwardly in the power stroke. In prior art engines, if ignition does not appear well before top dead center the piston moves at a rate that is excessive for maximum extraction of power from the burning charge. The present invention, as seen in the embodiment of FIG. 13, provides a relatively long dwell time near both top dead center and bottom dead center which dwell time provides sufficient time for pressure build up after ignition as well as providing additional time for the opening and closing of valves. In the figure, reference numeral 50 indicates a main power shaft to which is mounted for rotation therewith an elliptical power gear 52. Power gear 52 is mounted on shaft 50 about the geometric center of the gear. A piston gear 54 that is congruent with gear 52 is mounted for rotation about a shaft 56 which is spaced from shaft 50. Thus gears 52 and 56 will be continually enmeshed during the entire rotation thereof. Mounted for eccentric rotation with respect to shaft 56 in response to rotation of piston gear 54 are connecting rods 58 and 58a which connecting rods at their opposite ends are secured to pistons 60 and 60a, respectively. The pistons are reciprocably slidable in cylinders indicated schematically at 62 and 62a. In the relative position of gears 52 and 54 depicted in FIG. 13 piston 60a is at approximately top dead center and piston 60 is at approximately bottom dead center. In such position the angular speed of piston gear 54 is slow relative the angular speed of power gear 52 as a consequence of which the movement of each of the pistons immediately before and after top and bottom dead center is relatively slow, and the advantages stated above are obtained. As the pistons move in the cylinders their rate of travel gradually increases and is at a maximum during the central portion of the stroke. After piston gear 54 is rotated 180° from the position shown in FIG. 13 piston 60 will be at top and piston 60a at bottom dead center and the rate of piston movement within the cylinders immediately before and after dead center will be relatively slow. Consequently sufficient time for opening and closing valves (not shown) is available, even in engines operating at relatively high speeds.

From the foregoing detailed description those skilled in the art will appreciate the advantages accruing by incorporation of the present invention into conventional reciprocating machines. In conventional two or four cycle internal combustion reciprocating engines, for example, the piston rod length and the piston stroke determine the relative position of the piston within the cylinder at any given angle within the 360° of one revolution of the crankshaft. All these fixed time positions are not always designedly desirable. For a relatively low r.p.m. engine where fuel burning takes place in a relatively short time compared with the time of the piston expansion stroke, a relatively faster piston expansion rate immediately after burning is frequently desirable. Similarly, for a relatively high r.p.m. engine where fuel burning takes place over a greater percentage of the time of the piston expansion stroke, it is frequently desirable to have the piston remain closer to top dead center for a relatively longer period of time than is possible with present engines so that more combustion gases will be usefully expanded from closer to top dead center. The present invention makes practical such desirable piston-timing changes by means of a simple varying ratio gear train which can include spur, bevel, or helical gears to alter designedly the normal ("linear" herein) piston position relationships at various phases within one revolution of the main power shaft.

The present invention affords a gear reduction of two to one, three to one, etc. in the gear train merely by altering the size and design of the power shaft gear. Such a gear reduction makes possible, in a radial design, a greater number of cylinders grouped around a central power shaft gear.

The non-linear linkages of the present invention also render possible in a carbureted spark ignition engine higher compression ratios with present fuel or reduce the need for anti-knock fuel additives at present compression ratios. As peak combustion temperatures and pressures are approached near the end of combustion, faster piston expansion will more quickly reduce them, reducing pre-ignition tendencies.

Additionally, an engine incorporating the above described invention is capable of more practical operation when operating at low r.p.m. and below maximum throttle by allowing higher throttle at lower r.p.m.

From the foregoing it will be seen that the present invention provides an internal combustion engine of improved power and efficiency and one which secures the advantage of relatively fast piston movement during the power stroke without requiring an overall r.p.m. increase. Consequently improved torque at low speed together with other advantages of a non-linear piston movement recognized by the prior art are achieved in this invention without introduction of any complex slotted and/or spring loaded linkages as required by the prior art. Only straight forward gear linkages, the lubrication of which can be readily accomplished by known techniques, are necessary in practicing the present invention. Because of its simplicity the present invention simplifies the design of multi-cylinder engines.

The piston stroke control mechanism of this invention causes piston 12 to move more rapidly during one portion of the stroke than at another as compared with conventional torque transfer mechanisms. When this happens there are many times undesirable characteristics which may be encountered; for example, when the piston stroke control is arranged to move the piston faster during the power stroke there will be a more rapid rise in torque conversion to the crankshaft and a more rapid fall-off of torque conversion at the termination of the power stroke. Such a peak of torque conversion is contradictory in many instances to smooth engine operation. In the present invention the inertial characteristic of gear 22 can be controlled by selecting gears of appropriate mass, configuration, gear ratios and pivot points to cause the gears to have inertial characteristics which will cause the piston gear itself to absorb power during the interval of maximum torque conversion and to return that same power back to this system during other phases of engine operation. This feature allows the gears to compensate for the more rapid peak of energy generation and to spread the torque conversion to the crankshaft over a broader time base. It is believed that gear 22 should have such inertial characteristics that, when the engine is operated at its maximum rated power, at least 10% of the rotative mechanical energy delivered to gear 22 should be absorbed as angular kinetic energy by that gear during the interval that gear 22 has a decreasing gear ratio with respect to gear 28. With this requirement met, the majority of the absorbed angular kinetic energy is thereafter released to gear 28 and the power shaft at a subsequent time. This relationship can be established by calculations which are well known in the art.

While the factor of absorption of relative mechanical energy of the gears has been defined and described above in relation to the power stroke, it is believed apparent that the same characteristics can be employed in relation to other stroke portions such as, for example, in the situation where the greater piston movement might occur during a compression stroke. In such a case the rotative mechanical energy transfer between the crankshaft and the piston can be smoothed out to exist over a time base while at the same time the relative movement of the piston can be shifted in its velocity.

Thus, it can be seen that in the present invention piston velocity changes can be accomplished in a manner that will also allow torque conversion to the crankshaft to be normalized or spread over a broader time basis, thus allowing both the enhancement of improved engine efficiency and smoother operation.

For an engine employing a compression stroke occurring in less time than the expansion stroke (such as may be desirable in a high r.p.m. engine) inertial characteristics of the piston gear are also important. If that gear had no inertia, expansion power would be transmitted to the engine power shaft over a greater portion of a revolution of the power shaft than would be the case in an equivalent conventional engine. Therefore, the degree of power torque would be less, but applied to the power shaft longer. Therefore, if the piston gear has inertia, angular kinetic energy released from that gear during the first part of the power stroke would only add to less than conventional torque on the power shaft. This could be bearable.

Similarly, piston gear inertia could smooth out the compression torque occurring in less time than the expansion stroke, because piston gear inertia would increase normally necessary torque from the power shaft during the normally easy first part of compression, and piston gear inertia would also decrease normally necessary torque from the power shaft during the difficult last part of compression. To have a significant effect, it would seem (under close to maximum rated r.p.m. and throttle conditions) that the piston gear have sufficient inertial characteristics that that gear would provide by released angular kinetic energy during the last part of the compression stroke when an increasing effective gear ratio is occurring between the piston gear and the power shaft gear, at least 10% of the total compression work needed for the compression stroke.

One of the unique features of the present invention resides in the fact that the same engine depending on its direction of operation can be constructed to operate in two modes of operation. For example: in an engine employing varying radius gears with eccentrically mounted shafts, if the power shaft rotates in one direction, the expansion stroke can take longer than the compression stroke and the piston gear will absorb angular kinetic energy during the last part of the expansion stroke and the first part of the compression stroke, and will release angular kinetic energy during the last part of compression and the first part of expansion. This may be advantageous for high r.p.m. operation. Similarly, the same engine with appropriate adjustments may have the power shaft rotate in the other direction so that the compression stroke will take longer than the expansion stroke and the piston gear will release angular kinetic energy during the last part of the expansion stroke and the first part of the compression stroke, and will absorb angular kinetic energy during the last part of compression and the first part of expansion. This may be advantageous for medium or low r.p.m. operation. Thus, referring to FIG. 6, when the engine is operating in the direction as indicated by the arrows, the compression stroke will take longer than the expansion stroke. However, if the engine is reversed so that it operates in a direction exactly opposite to the arrows indicated in the respective gears, the expansion stroke will take longer than the compression stroke.

While several embodiments of the invention have been shown and described it will be apparent that other adaptations and modifications can be made without departing from the true spirit and scope of the invention.

What is claimed is:

1. In an internal combustion engine including a plurality of cylinders each having a piston reciprocally slidable therein and a main power shaft journalled for rotation about an axis in fixed space relation to said cylinders, an improved piston stroke control apparatus for operatively connecting the pistons to the shaft comprising a plurality of piston gears one of which is associated with each said piston, each said piston gear being mounted for rotation about an axis adjacent to the cylinder associated therewith, means for connecting each said piston to the piston gear associated therewith so that said piston reciprocates in response to rotation of said gear, power gear means mounted on said power shaft for rotation therewith, said power gear means having teeth for enmeshing with said piston gears so that said main power shaft rotates in response to reciprocation of said pistons, both said piston gears and said power gear means mounted with the center point of the gears being at their axes of rotation, said piston gears and said power gear means being constructed and arranged to effect varying gear ratios therebetween so that said pistons reciprocate non-linearly with respect to rotation of said main power shaft.

2. Piston stroke control apparatus according to claim 1 wherein said power gear means include an elliptical gear with its focus mounted coaxially with said power shaft and wherein each said piston gear consists of an elliptical gear enmeshed with said power gear in substantially coplanar relation thereto.

3. A piston stroke control apparatus according to claim 1 wherein said power gear means includes a helical gear and wherein said piston gear includes a mating helical gear, the teeth of said helical gear being formed with varying helix angles about the periphery thereof.

References Cited by the Examiner

UNITED STATES PATENTS

| | | | |
|---|---|---|---|
| 1,191,827 | 7/1916 | Reese | 123—197 |
| 2,420,779 | 5/1947 | Holmes | 123—197 |
| 2,877,755 | 3/1959 | Danilewicz | 74—393 X |
| 2,957,363 | 10/1960 | Ingham et al. | 74—393 |

FOREIGN PATENTS 143,120  5/1920  Great Britain.

MARK NEWMAN, *Primary Examiner.*

WENDELL E. BURNS, *Examiner.*